United States Patent [19]
Tucker et al.

[11] Patent Number: 5,856,420
[45] Date of Patent: Jan. 5, 1999

[54] BIS(ISOBUTYRALDIMINE) OF 1,4-DIAMINOBUTANE IN HDI TRIMER AND BIURET-BASED COATINGS

[75] Inventors: Benjamin W. Tucker, Bethany; Henry G. Barnowski, Jr., Durham; Edward A. Barsa, Cheshire; Peter J. Whitman, Hamden; Augustin T. Chen, Cheshire; Willard F. Burt, Bristol; Stephen L. Goldstein, Cheshire; James M. O'Connor, Branford, all of Conn.

[73] Assignee: Arco Chemical Technology, L.P., Greenville, Del.

[21] Appl. No.: 634,072

[22] Filed: Apr. 17, 1996

[51] Int. Cl.$^6$ .............................. C08G 18/08; C08K 5/29
[52] U.S. Cl. ...................... 528/53; 524/236; 524/590; 528/44; 528/52; 528/55; 528/85
[58] Field of Search .................. 528/44, 59, 85, 528/53; 524/590, 237, 236

[56] References Cited

U.S. PATENT DOCUMENTS 5,214,086  5/1993  Mormile et al. ..................... 524/188
5,354,834  10/1994  Yoshida et al. ..................... 528/44
5,444,117  8/1995  Wade et al. ......................... 528/44
5,473,044  12/1995  Mafoti et al. ....................... 528/55
5,545,705  8/1996  Hicks et al. ......................... 528/44

*Primary Examiner*—Tae Yoon
*Attorney, Agent, or Firm*—Dale Lynn Carlson; Wiggin & Dana

[57] ABSTRACT

Disclosed are new coatings compositions based on an HDI isocyanurate or biuret polyisocyanate and a bis(imine) reaction product of a diaminoalkane containing between two and five carbon atoms with an alkyl aldehyde containing between four and seven carbon atoms (advantageously a bis(imine) product of the reaction of 1,4-diaminobutane and isobutyraldehyde). The latter bis(imine) is completely miscible in HDI isocyanurate and biuret polyisocyanates, and, as a reactive diluent, allows the preparation of high performance coatings formulations that require only small amounts of solvents to achieve a conveniently sprayable viscosity.

8 Claims, No Drawings

BIS(ISOBUTYRALDIMINE) OF 1,4-DIAMINOBUTANE IN HDI TRIMER AND BIURET-BASED COATINGS

FIELD OF THE INVENTION

This invention generally relates to new coatings compositions based on an HDI isocyanurate or biuret polyisocyanate and the bis(imine) derived from 1,4-diaminobutane and isobutyraldehyde. This bis(imine) is completely miscible in HDI isocyanurate and biuret polyisocyanates, and, as a reactive diluent, allows the preparation of coatings formulations that require only small amounts of solvents to achieve a conveniently sprayable viscosity.

BACKGROUND OF THE INVENTION

Difunctional aldimines and ketimines, that is condensates of diamines with aldehydes or ketones, or, the condensates of dialdehydes or diketones with primary amines, are known in the prior art. The use of aldimines and ketimines in urethane coatings and sealant compositions is also known. For example, their use as-catalysts for urethane coatings and sealant systems are described in U.S. Pat. Nos. 3,553,118 and 3,637,903. Other disclosures of aldimines and ketimines in the prior art are largely directed at their use in moisture cure systems: for example, together with blocked isocyanate terminated. prepolymers (see U.S. Pat. Nos. 3,267,078; 4,507,443; and 4,847,319); and, with free isocyanate curatives (see U.S. Pat. Nos. 3,420,800; 3,440,087; 3,567,692; 3,589,932; 3,629,013; and 3,793,417). This last patent, U.S. Pat. No. 3,793,417, shows the use of systems based on aldimines, isocyanates and polyols in moisture and in heat cured coatings.

The bis(imine) reaction product of 1,4-diaminobutane with isobutyraldehyde is known and disclosed, for example, in U.S. Pat. No. 2,416,042. Additional information relating to the production and photochemistry of these compounds is disclosed in a 1985 technical journal article (J. Inst. Org. Khim., Moscow, USSR, 1985, 7, 1612–15) and in a 1991 technical journal article (Bittner and Rademacher, J. Chem. Research (S), 1991, 60–61), respectively.

Japanese Kokai JP 07 18,051, published on Jan. 20, 1995, discloses a polyurethane elastomer-forming composition containing, inter alia, a urethane prepolymer of 2,4-TDI, polyoxypropylene glycol, polyoxypropylene triol and a dialdimine obtained by reacting 1,4-diaminobutane and p-tolualdehyde. This elastomer-forming composition is said to exhibit good storage stability.

U.S. Pat. No. 5,214,086 discloses a plethora of aldimine and ketimine compounds within an empirical structural formula shown for such compounds. The compounds of the ’086 patent are disclosed therein as reactive diluents for reducing the volatile organic content (“VOC”) of a paint composition by increasing the solids content of the paint without adversely affecting the paint’s performance.

Reactive diluents, such as the above-discussed difunctional aldimines are referred to as diluents since they have low viscosities, and are reactive, inasmuch as they participate in the film forming reaction during the formation of a coating. In view of these characteristics of reactive diluents, they are suitably employed to replace some or most of the solvent that is otherwise needed to reduce the viscosity of a coating formulation to a desired low viscosity, thereby reducing the quantity of VOCs emitted by the system, an advantage from an environmental and toxicology standpoint.

It has now been found by the present inventors that previously known aldimine and ketimine reactive diluents, such as those specifically described, for example, in the above-discussed ’086 patent, suffer from a key deficiency. More specifically, these reactive diluents have relatively low solubility in polyisocyanates that comprise HDI isocyanurates (“trimer”) and/or HDI biurets. Since a completely miscible system is a prerequisite for insuring a homogeneous film to provide good physical properties in the resulting coating, such low solubility reactive diluents require the use of additional formulation steps and/or solubilizing additives to permit the use of these reactive diluents in coating compositions to provide high performance coatings having good physical properties. Illustrative steps and solubilizing additives needed when using these prior art reactive diluents include, for example, the following: (a) using higher levels of solvents, which undesirably increases the formulation’s VOC content; (b) replacing some or most of the isocyanurate or biuret polyisocyanate with an HDI uretidione based polyisocyanate, which reduces the average isocyanate functionality of the system and thereby reduces the crosslink density and the corresponding physical properties of the resulting film; and/or, (c) using lower molecular weight, lower functionality isocyanate reactive resins, which, likewise, reduces the crosslink density and performance characteristics of the resulting film. The second (b) and third option (c) also restrict the number of suitable isocyanate curatives and isocyanate reactive resins available to the coatings formulator, thus rendering the development of such systems more inflexible than otherwise might be desired.

Thus, there is a heretofore unsatisfied need in the marketplace for an imine-type reactive diluent that is completely soluble in HDI isocyanurate and biuret based polyisocyanates. Several such highly desirable reactive diluents are provided by virtue of the present invention.

SUMMARY OF THE INVENTION

In one aspect, the present invention relates to a composition comprising:

(a) a reaction product of a diaminoalkane containing between two and five carbon atoms with an alkyl aldehyde containing between four and seven carbon atoms, and (b) a compound selected from the group consisting of hexamethylene diisocyanate isocyanurate, hexamethylene diisocyanate biuret, and combinations thereof.

In another aspect, the present invention relates to a composition comprising (and advantageously consisting essentially of):

(a) a bis(imine) reaction product of 1,4-diaminobutane and isobutyraldehyde, and (b) a compound selected from the group consisting of hexamethylene diisocyanate isocyanurate, hexamethylene diisocyanate biuret, and combinations thereof.

In another aspect, the present invention relates to a coating composition comprising (and advantageously consisting essentially of):

(a) a bis(imine) reaction product of a diaminoalkane containing between two and five carbon atoms with an alkyl aldehyde containing between four and seven carbon atoms (advantageously a reaction product of 1,4-diaminobutane with isobutyraldehyde), (b) a polyisocyanate comprising (and advantageously consisting essentially of) a hydroxy-reactive compound selected from the group consisting of isocyanurate-containing cyclotrimerized hexamethylene diisocyanate (“HDI trimer”), hexamethylene diisocyanate biuret, and combinations thereof, (c) a polyhydroxy compound selected from the group consisting of polyhydroxypolyesters, polyhydroxypolyethers, polyhydroxypolyacrylates having an average hydroxyl number of between about 20 and about 250, and (d) optionally, a catalyst to promote the polyurethane-forming reaction. Advantageously, the ratio of equivalent weight of component (a) to component (b) to component (c) in this coating composition is between about 1 to about 1–1.5 to about 0.0–0.5, respectively. Component (d) is a catalyst that is advantageously present in the coating composition in an amount of between zero and five weight percent, based upon the weight of the coating composition.

In yet another aspect, the present invention relates to a process for making a low VOC coating composition which comprises contacting a bis(imine) reaction product of a diaminoalkane containing between two and five carbon atoms with an alkyl aldehyde containing between four and seven carbon atoms (advantageously a reaction product of 1,4-diaminobutane with isobutyraldehyde), with a polyisocyanate composition containing HDI trimer or HDI biuret to provide said low VOC coating composition, said low VOC coating composition being suitable for spray application onto a substrate at a solvent loading level of less than 3.5 pounds, preferably, less than 2 pounds of said solvent, per gallon of said low VOC coating composition. It is even possible to prepare coating compositions in which no solvent is employed, but this is often not practical from the standpoint of providing a proper spray viscosity for the coating composition.

In still another aspect, the present invention relates to a process for coating a substrate which comprises the steps of:

(1) preparing a low VOC coating composition by contacting a bis(imine) reaction product of a diaminoalkane containing between two and five carbon atoms with an alkyl aldehyde containing between four and seven carbon atoms (advantageously a reaction product of 1,4-diaminobutane with isobutyraldehyde), with a polyisocyanate composition containing HDI trimer or HDI biuret to provide said low VOC coating composition, said low VOC coating composition being suitable for spray application onto a substrate at a solvent loading level of less than 3.5 pounds, preferably, less than 2 pounds of said solvent, per gallon of said low VOC coating composition, and (2) applying (preferably by spraying) said low VOC coating composition to a substrate by contacting said low VOC coating composition with said substrate.

These and other aspects will become apparent upon reading the following detailed description of the invention.

DETAILED DESCRIPTION OF THE INVENTION

It has now been surprisingly found, in accordance with the present invention, that a unique bis(imine) compound, namely the reaction product of 1,4-diaminobutane and isobutyraldehyde, is easily prepared and provides excellent miscibility with HDI-based polyisocyanates, notably the cyclotrimerized hexamethylene diisocyanate isocyanurate polyisocyanates ("HDI trimer"), HDI biuret, and combinations thereof. Due to compatibility problems with other bis(imines) in the presence of HDI trimer and/or HDI biuret, heretofore it has been necessary to utilize uretidione-containing hexamethylene diisocyanate ("HDI diner") to replace part or most of the HDI trimer and/or HDI biuret in the system. Unfortunately for the prior art systems manufacturers, HDI dimer-based systems do not provide the excellent physical property performance characteristics that are provided by systems based upon the use of HDI trimer and/or HDI biuret as curatives. Accordingly, the present invention satisfies a need in the polyurethanes coatings systems manufacturing industry, particularly with respect to low VOC, high performance clear coats for the automotive industry.

It has also been found, in accordance with the present invention, that certain other bis(imines) that are the reaction products of other diaminoalkanes, such as 1,2-diaminoethane, 1,3-diaminopropane, or a combination thereof, with other aldehydes, such as isobutyraldehyde, 2-ethylhexanal, 2,3-dimethylpentanal, or a combination thereof, are suitably produced, and have at least partial solubility in HDI trimer and biuret.

In a preferred embodiment, the present invention relates to new coatings compositions comprising an HDI isocyanurate or biuret polyisocyanate, the bis(imine) reactive diluent derived from 1,4-diaminobutane and isobutyraldehyde and, optionally, a polyalcohol resin. The bis(imine) is completely miscible in HDI isocyanurate and biuret polyisocyanates, and, when used as a reactive diluent, allows the preparation of coatings formulations that require only small amounts of solvents to achieve a conveniently sprayable viscosity, desirably an initial viscosity of between about 16 and about 35 seconds (Zahn #2 cup) at 25° C. Coatings formulations based upon these coating compositions advantageously employ only small amounts of solvents to achieve a conveniently sprayable viscosity, suitably a solvent content of between about 0.5 and about 3.5 pounds, preferably less than about 2.0 pounds, per gallon of the coating formulation.

This invention also relates to a process of formulating paints by using aldimines wherein the aldimines are not completely hydrolyzed into amine and aldehyde, but preferably react with the isocyanate as the imines. This is a very important aspect in this invention because when the aldimine hydrolyzes into amine and a volatile compound namely the aldehyde, the resulting amine reacts instantaneously with the isocyanate and jeopardizes the pot-life of the system and can adversely affect the appearance of the paint. Also, such hydrolysis tends to provide a volatile organic content in the form of the aldehyde, and hence will not be as effective, as otherwise might be desired, in providing a low VOC coating composition.

The methods of preparing imines are well known. The bis(isobutyraldimine) of 1,4-diaminobutane can be prepared by contacting isobutyraldehyde with 1,4-diaminobutane in a molar ratio of at least two to one. Preferably, a small excess of isobutyraldehyde is used, although molar ratios of three or more to one can be used. The isobutyraldehyde may be added to the amine or the amine may be added to carbonyl compound. Since the reaction evolves heat, the addition should be carried out at rate that does not overwhelm the cooling capability of the reactor. A range of temperatures may be used in this addition step. Generally, low temperatures are preferred because they reduce the likelihood of undesirable side reactions. Temperature ranges are limited by the boiling point of the isobutyraldehyde or by any optional solvent used, however, temperatures between −20° and 100° C. are preferred with temperatures between 20° and 60° C. being most preferred.

A variety of solvents, which do not react with the isobutyraldehyde or the diaminobutane and in which the byproduct water is not soluble, are suitably used in the preparation of the bis(imine) of this invention. Non-polar aromatic, aliphatic and cycloaliphatic hydrocarbons, and ethers are preferred solvents. However, as noted hereinabove, generally solvents are not needed and, preferably, the reaction is run in an excess of the aldehyde.

Once the addition is complete, the next step is to remove the water that is formed as a byproduct of the condensation. This may be accomplished by a variety of techniques. For example, the aqueous layer may be removed as a separate phase. This may be accomplished with or without the addition of an ionic inorganic compound, such as sodium chloride, to aid in the separation, followed by treatment of the product layer with a desiccant such as sodium sulfate. Alternatively, the water may be removed by direct distillation or by azeotropic distillation with an optionally used solvent or excess carbonyl compound in a Dean-Stark apparatus. Finally, any residual water and any excess aldehyde can be removed by distillation, preferably at reduced pressure in a conventional distillation apparatus or any of the more efficient mechanical devices such as thin, falling or wiped film evaporators.

The most preferred method for preparing these adducts is employed in the synthesis examples, below. It represents a most practical process for use on a commercial scale. A small excess of the aldehyde is added to the diamine at a rate that does not exceed the cooling capacity of the system. After the byproduct water forms a separate phase, the organic layer is separated and passed through a Wiped Film Evaporator, twice. The first pass is carried out at moderate temperatures and pressures, to remove residual water and excess aldehyde. The heavy fraction is passed through the WFE at higher temperature and lower pressure to take the product overhead and separate it from any higher molecular weight byproducts.

Using this process, it was found that only those aldehydes with branching alpha to the carbonyl group would afford bis(aldimines) that could be prepared and distilled in reasonable yield. Further, in some cases, while their HDI adduct compatibility was good, diamines with less than four carbons gave poor yields by this process. Thus, the general formula for bis(aldimines) that can be easily prepared in acceptable yield and are fully compatible with at least HDI trimer appears to be

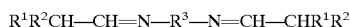

$$R^1R^2CH\text{---}CH\text{=}N\text{---}R^3\text{---}N\text{=}CH\text{---}CHR^1R^2$$

where: $R^1$, $R^2$ are lower alkyl, they may be the same or different, but not hydrogen; $R^3$ is the residue of a C2 to C5 diamine; and, the total number of carbon atoms in the molecule is in the range of about 10 to about 16. However, only the bis(aldimine) derived from 1,4-diaminobutane and isobutyraldehyde combines the highly desirable characteristics of excellent HDI trimer and biuret solubility with being readily synthesized and purified in high yield from readily available materials by a convenient and efficient process.

The bis(aldimine) reactive diluent of the present invention may be added to the coating composition, or fabricated as part of the coating composition, and the resulting composition typically requires little or no solvent, in order to reduce it to spray viscosity. Indeed, the present inventors have now discovered that because of its surprising solubility in HDI isocyanurate and/or HDI biuret, practical spray coating formulations can be prepared at less than 2.0 pounds of solvent per gallon of system using the bis(imine) derived from 1,4-diaminobutane and isobutyraldehyde with readily available HDI trimer and HDI biuret based curatives. This is a significantly lower solvent requirement than is disclosed in the HDI trimer-based working examples of the previously discussed U.S. Pat. No. 5,214,086.

Particularly useful coating systems are based upon hydroxyl functional resins which are polymers that have at least an average of two hydroxyl groups attached to each polymer chain. These polymers may contain acrylic, polyester, alkyd/acrylic, polyether or other constituent materials known to the art. Some commercial examples of acrylic hydroxyl resins are Joncryl 500 (Johnsons Wax) and AU608 (Rohm and Haas). Examples of polyester resins include Desmophen 650A-65 (Bayer) and K-Flex 188 (King Industries). Another suitable polyester is the reaction product of 2 to 3 moles of epsilon-caprolactone with a diol such as butanediol or with a triol such as glycerine such as LEXOREZ 1100-220 from Inolex Chemical, TONE 201 and TONE 301, both products of Union Carbide.

High quality, low VOC two component polyurethane coating compositions of this invention can be prepared by mixing:

a) The bis(imine) derived from 1,4-diaminobutane and isobutyraldehyde with b) Readily available HDI trimer and HDI biuret based curatives, c) Optionally, with other polyisocyanates (such HDI uretidiones, HDI allophanates and IPDI isocyanurates), d) Optionally, with organic polyhydroxyl compounds, in particular organic polyhydroxypolyesters, polyhydroxypolyethers, polyhydroxypolyacrylates, and, e) Optionally, with low molecular weight compounds having two or more isocyanate reactive hydrogens, such as, polyalcohols and polyamines known from polyurethanes coatings technology.

To accelerate hardening, the coating compositions may contain known polyurethane-forming catalysts, for example, tertiary amines such as triethylamine, pyridine, picolines, benzyldimethylamine, N,N-dimethylaminocyclohexane, N-methylpiperidine, pentamethyldiethylenetriamine, 1,4-diazabicyclo[2,2,2]octane, and N,N'-dimethylpiperazine; or metal salts such as iron (III) chloride, zinc chloride, zinc 2-ethylcaproate, tin(II) 2-ethylcaproate, dibutyltin(IV) dilaurate, and molybdenum glycolate.

The coating compositions may also contain other additives such as pigments, dyes, fillers, leveling agents, and solvents. The coating compositions may be applied to the substrate to be coated in solution by conventional methods such as painting, rolling, pouring, or spraying. The coating compositions according to this invention provide coatings which adhere surprisingly well to a metallic substrate, and are particularly light-fast, color stable in the presence of heat, and are very resistant to abrasion. Furthermore, they are characterized by high hardness, elasticity, very good resistance to chemicals, high gloss, excellent weather resistance, and good pigmenting properties.

The results provided by the reactive diluent of the present invention show a marked improvement over prior art aldimines in HDI trimer-based coating compositions. As an illustration, three aldimines are specifically described in the above-described U.S. Pat. No. 5,214,086, namely the reaction products of (a) 3-aminomethyl-3,5,5-trimethylcyclohexylamine (isophoronediamine, "IPDA") and two equivalents of isobutyraldehyde; (b) bis-(2-methyl-4-aminocyclohexyl)methane plus two equivalents of isobutyraldehyde; and, (c) triethylene glycol diamine plus two equivalents of isobutyraldehyde. Unfortunately, all of these three aldimines have poor solubility in HDI trimer, and require the use of relatively high levels of solvent to obtain a homogeneous system. Indeed, the working examples in the '086 patent demonstrate VOC reductions down to only 3.3 pounds per gallon when a polyisocyanate based on HDI trimer is used. Lower VOC formulations (2.8 pounds per gallon) are achieved only with the use of an additional reactive diluent (a bis-secondary amine), and using such a secondary amine reactive diluent incurs the cost of an impracticably short pot life for coating compositions containing this secondary amine.

The following examples are intended to illustrate, but in no way limit the scope of, the present invention. All patents and patent applications referred to herein are incorporated herein by reference in their entirety. All quantities are shown on a weight basis unless otherwise indicated. As used herein, the term "VOC" (volatile organic compounds) refers to coatings formulation components that are emitted during the curing/drying process; "isobutyraldehyde" is 2-methylpropanal; "IPDA" (isophoronediamine) is 3-aminomethyl-3,5,5-trimethylcyclohexylamine; "HDA" is 1,6-diaminohexane; "IPDI" (isophorone diisocyanate) is 3-isocyanatomethyl-3,5,5-trimethylcycloexylisocyanate; and "HDI" is 1,6-diisocyanatohexane.

EXAMPLES

Example 1—(Preparation of Bis(aldimines))

To a suitably sized 3-neck round bottom flask equipped with a condenser, a thermometer, a nitrogen inlet, a pressure equalizing addition funnel and a mechanical stirrer was added 1 mole of the diamine, (optionally in an equal weight of an inert, water insoluble solvent such as toluene). The stirrer and a slow flow of nitrogen were started and the diamine was cooled to 20° C. with a water ice bath. The aldehyde (2.1 moles) was charged to the addition funnel and then added to the diamine, dropwise, over a period of about 90 minutes. During the addition, the temperature was maintained at less than about 30° C., with a water ice bath, as needed. The reaction mixture became cloudy towards the end of the addition due to the water displaced during the reaction. The resulting mixture was heated at 70° C. for one hour and then added to a separatory funnel. After allowing the mixture to cool, the (lower) water layer was removed and the product was stripped of residual water, excess aldehyde and any solvent by passing it through a wiped film evaporator at 50° to 70° C. and a pressure of 200 to 300 mm Hg. The product was recovered from the resulting heavy fraction by passing it through the evaporator at 80° to 100° C. and a pressure of 1 to 10 mm Hg. The bis(aldimine) product is essentially pure and was used without any further treatment. The products prepared by this procedure are listed in Table 1.

Example 2—(Bis(aldimine) Solubility Tests)

The bis(aldimines) of Example 1 were evaluated for polyisocyanate solubility and compatibility by agitating a mixture of 20 grams of the bis(aldimine) and 40 grams of the polyisocyanate in a 4 oz vial for about 10 minutes. The compatibility of the aldimine was rated, after standing for 24 hours, as: "Full" if the sample remained clear and homogeneous; "None" if the relative size of the aldimine layer had decreased less than 50% compared to its size in the unmixed sample; and, "Part" if the relative size of the aldimine layer had decreased more than 50% compared to its size in the unmixed sample or if the single phase mixed sample was turbid. Samples of the bis(aldimines) were first tested in Polyisocyanate #1. only those bis(aldimines) with at least partial solubility in Polyisocyanate #1 were tested in Polyisocyanate #2. Only the bis(aldimine) (Example 1 g) derived from 1,4-diaminobutane and isobutyraldehyde was fully soluble in all three polyisocyanates. The results of the tests by this procedure are also shown in Table 1.

TABLE 1

BIS(ALDIMINE) SYNTHESIS AND SOLUBILITY

| | Starting Materials | | Yield | Solubility | | |
|---|---|---|---|---|---|---|
| Ex | Diamine | Aldehyde | (%) | pIso #1 | pIso #2 | pIso #3 |
| 1a | 1,2-Diaminoethane | Butanal | 15 | NT* | NT | NT |
| 1b | 1,2-Diaminoethane | Isobutyraldehyde | 25 | Full | Part | None |
| 1c | 1,3-Diaminopropane | Isobutyraldehyde | 45 | Full | Full | Part |
| 1d | 1,3-Diaminopropane | Butanal | 17 | NT | NT | NT |
| 1e | 1,4-Diaminobutane | Ethanal | 0 | NT | NT | NT |
| 1f | 1,4-Diaminobutane | 2-Ethylhexanal | 89 | Part | Part | None |
| 1g | 1,4-Diaminobutane | Isobutyraldehyde | 91 | Full | Full | Full |
| 1h | 1,4-Diaminobutane | Butanal | 10 | NT | NT | NT |
| 1i | 1,4-Diaminobutane | 2-Ethylbutanal | 82 | None | NT | NT |
| 1j | 1,4-Diaminobutane | 3-Methylbutanal | 5 | NT | NT | NT |
| 1k | 1,6-Diaminobutane | Isobutyraldehyde | 90 | Part | None | NT |
| 1l | 1,6-Diaminobutane | Propanal | 30 | None | NT | NT |
| 1m | 1-Methyl-2,4(6)-diamino-cyclohexane | Isobutyraldehyde | 85 | Part | None | NT |
| 1n | 2-Methyl-1,5-diaminopentane | Isobutyraldehyde | 87 | Part | None | NT |
| 1o | 3,6-Dioxa-1,8-diaminooctane | Isobutyraldehyde | 84 | None | NT | NT |
| 1p | Bis(4-aminocyclohexyl)methane | 2-Ethylhexanal | 90 | None | NT | NT |
| 1q | Bis(4-aminocyclohexyl)methane | Isobutyraldehyde | 91 | None | NT | NT |
| 1r | Isophorone Diamine | 2-Ethylhexanal | 88 | None | NT | NT |
| 1s | Isophorone Diamine | Isobutyraldehyde | 91 | Part | None | NT |
| 1t | Isophorone Diamine | Benzaldehyde | 75 | None | NT | NT |

TABLE 1-continued

BIS(ALDIMINE) SYNTHESIS AND SOLUBILITY

| | Starting Materials | | Yield | Solubility | | |
|---|---|---|---|---|---|---|
| Ex | Diamine | Aldehyde | (%) | pIso #1 | pIso #2 | pIso #3 |
| 1u | 1,2-Diaminoethane | 2,3-Dimethyl-pentanal | 65 | Full | Part | NT |

POLYISOCYANATE #1: HDI isocyanurate.
POLYISOCYANATE #2: HDI biuret; 3,000 cps viscosity.
POLYISOCYANATE #3: HDI biuret; 9,000 cps viscosity.
*NT denotes "not tested"

Example 3–(Coatings According to this Invention)

Low VOC coatings are formulated by-blending the following constituents:

ALDIMINE #1g: (Example 1).
POLYISOCYANATE #1: (Example 2).
POLYISOCYANATE #2: (Example 2).
POLYISOCYANATE #4: IPDI isocyanurate, 70% in a 2:1 mixture of Aromatic-100 (hydrocarbon solvent) and butyl acetate.
ACRYLIC RESIN: A polyacrylic polyol with an equivalent weight of about 500, available as SCX 920, a product of S. C. Johnson.
ORGANIC SOLVENTS: 2/1 by weight mixture of n-butyl acetate and methyl n-amyl ketone.
ADDITIVES: Mar and slip silicones, accelerator catalysts.

The weight ratios of the components are shown in Table 2. The physical properties of the formulations and the resulting films are shown in Table 3.

TABLE 2

FORMULATIONS OF THIS INVENTION

| Component\Example | #3a | #3b | #3c | #3d | #3e | #3f |
|---|---|---|---|---|---|---|
| Acrylic Resin #1 | 7.85 | — | 7.85 | — | 7.85 | — |
| Aldimine #1 g | 40.89 | 40.89 | 40.89 | 40.89 | 40.89 | 40.89 |
| Polyisocyanate #1 | 86.82 | 86.82 | — | — | 72.19 | 72.19 |
| Polyisocyanate #2 | — | — | 84.50 | 84.50 | — | — |
| Polyisocyanate #4 | — | — | — | — | 30.94 | 30.94 |
| Solvent | 39.0 | 39.0 | 39.0 | 39.0 | 39.0 | 39.0 |

Viscosities, in seconds, were measured using a Zahn #2 cup. The pot life, in hours, is defined as the time it takes for the viscosity to double. The dry times and gel times were measured using a BYK meter on freshly coated glass plates.

The panels for the adhesion tests were first sprayed with a black base coat onto phosphatized 4" by 12" cold roll steel panels, air dried for 30 minutes, and then sprayed, wet-on-wet, with the aldimine containing clear coat formulations. The test panels for the other coatings property measurements were prepared by spraying the test formulations onto phosphatized 4" by 12" cold roll steel panels and then allowing them to cure at room temperature for 14 days.

The data shown in Table 3 demonstrate that formulations prepared using Aldimine #1g (the bis(aldimine) derived from 1,4-diaminobutane and isobutyraldehyde) and only about 2 pounds of solvents per gallon, have viscosities that are low enough to be easily applied by spraying, yet yield films with excellent physical properties.

TABLE 3

PHYSICAL PROPERTIES OF FORMULATIONS AND FILMS OF THIS INVENTION

| Property\Example # | 3a | 3b | 3c | 3d | 3e | 3f |
|---|---|---|---|---|---|---|
| VOC (lbs/gal) | 1.93 | 1.81 | 1.96 | 1.85 | 2.02 | 1.92 |
| Spray Viscosity, Zahn Cup #2, seconds | 22 | 21 | 22 | 21 | 23 | 22 |
| Pot Life, hours | 12 | 12 | 12 | 12 | 12 | 12 |
| Dry Time, BYK Meter, total hours | 1.0 | 4.6 | 0.3 | 2.7 | 1.3 | 6.0 |
| Gel Time, BYK Meter, hours | 0.7 | 2.8 | 0.3 | 1.4 | 1.0 | 3.4 |
| Tack Free Time, hours | 1.0 | 4.6 | 0.3 | 2.7 | 12 | 6.0 |
| Pendulum Hardness, Koenig | 126 | 132 | 98 | 103 | 125 | 129 |
| Impact, in/lb | | | | | | |
| Direct | >160 | >160 | >160 | >160 | >160 | >160 |
| Reverse | >160 | >160 | >160 | >160 | 120 | 140 |
| Adhesion, Crosshatch | pass | pass | pass | pass | pass | pass |
| Gloss | | | | | | |
| 20° | 105 | 100 | 100 | 106 | 102 | 101 |
| 60° | 119 | 114 | 112 | 122 | 115 | 114 |
| DOI | 90 | 70 | 90 | 90 | 90 | 90 |
| Mandrel Bend | pass | pass | pass | pass | pass | pass |
| Solvent Resistance | | | | | | |
| MEK Double Rub, 100 times | pass | pass | pass | pass | pass | pass |
| 10% HCl | pass | pass | mark | mark | pass | pass |
| 10% NaOH | pass | pass | pass | pass | pass | pass |
| Xylene | pass | pass | pass | pass | pass | pass |
| Gasoline, 5 days | pass | pass | mark | mark | pass | pass |

Example 4

(Comparative Formulations)

Low VOC coatings are formulated by blending the following constituents:

ALDIMINE #1s: (Example 1).
POLYISOCYANATE #1: (Example 2).
POLYISOCYANATE #2: (Example 2).
POLYISOCYANATE #4: (Example 3).
ACRYLIC RESIN: (Example 3).
ORGANIC SOLVENTS: 2/1 by weight mixture of n-butyl acetate and methyl n-amyl ketone.
ADDITIVES: Mar and slip silicones, accelerator catalysts.

For comparison, essentially the same formulations were prepared using the bis(aldimine) derived from isophorone diamine and isobutyraldehyde (Aldimine #1s, which is also commercially available as VESTAMIN A-139 from Huels America). Small adjustments were necessary to compensate for the difference in equivalent weights between Aldimines

1g and #1s. The weight ratios of the components are shown in Table 4. The physical properties of the formulations are shown in Table 5. Because of its higher equivalent weight, more Aldimine #1s had to be used. Therefore, the formulations prepared using Aldimine #1s and about 2 pounds of solvents per gallon have viscosities that are lower than those using Aldimine #1g. However, because of the solvent loss during spraying and the poor compatibility of Aldimine #1s with HDI isocyanurate and biuret polyisocyanates, the resulting coatings did not cure to homogeneous films and therefore physical property measurements could not be made on them. Indeed, the incompatibility of these formulations was so severe that neither pot life nor BYK Meter measurements could be made.

TABLE 4

COMPARATIVE FORMULATIONS

| Component\Example | #4a | #4b | #4c | #4d | #4e | #4f |
|---|---|---|---|---|---|---|
| Acrylic Resin #1 | 7.85 | — | 7.85 | — | 7.85 | — |
| Aldimine #1s | 58.51 | 58.51 | 58.51 | 58.51 | 58.51 | 58.51 |
| Polyisocyanate #1 | 86.82 | 86.82 | — | — | 72.19 | 72.19 |
| Polyisocyanate #2 | — | — | 84.50 | 84.50 | — | — |
| Polyisocyanate #4 | — | — | — | — | 30.94 | 30.94 |
| Solvent | 39.0 | 39.0 | 39.0 | 39.0 | 39.0 | 39.0 |

TABLE 5

PHYSICAL PROPERTIES OF THE COMPARATIVE FORMULATIONS

| Property\Example # | 4a | 4b | 4c | 4d | 4e | 4f |
|---|---|---|---|---|---|---|
| VOC (lbs/gal) | 1.76 | 1.70 | 1.78 | 1.74 | 1.93 | 1.80 |
| Spray Viscosity, Zahn Cup #2, seconds | 22 | 21 | 22 | 21 | 23 | 22 |

What is claimed is:

1. A coating composition comprising:
   (a) a bis(imine) reaction product of a diaminoalkane containing between two and five carbon atoms with an alkyl aldehyde containing between four and seven carbon atoms,
   (b) a polyisocyanate comprising a hydroxy-reactive compound selected from the group consisting of isocyanurate-containing cyclotrimerized hexamethylene diisocyanate ("HDI trimer"), hexamethylene diisocyanate biuret (HDI biuret), and combinations thereof,
   (c) a polyhydroxy compound selected from the group consisting of polyhydroxypolyesters, polyhydroxypolyethers, polyhydroxypolyacrylates having an average hydroxyl number of between about 20 and about 250, and
   (d) optionally, a catalyst to promote a polyurethane-forming reaction among components (a), (b) and (c), said coating composition being a low volatile organic content (VOC) coating composition being suitable for spray application onto a substrate at a solvent loading level of less than 2.0 pounds Per gallon of said low VOC coating composition.

2. The composition of claim 1 wherein said bis(imine) reaction product is a reaction product of 1,4-diaminobutane with isobutyraldehyde.

3. The coating composition of claim 1 which consists essentially of components (a), (b) and (c).

4. The composition of claim 1 which additionally contains a catalyst to promote the polyurethane-forming reaction.

5. The composition of claim 4 wherein said catalyst is a tertiary amine catalyst.

6. The composition of claim 4 wherein said catalyst is selected from the group consisting of triethylamine, pyridine, picolines, benzyldimethylamine, N,N-dimethylaminocyclohexane, N-methylpiperidine, pentamethyldiethylenetriamine, 1,4-diazabicyclo[2,2,2]octane, and N,N'-dimethylpiperazine; and metal salts, said metal salt being selected from the group consisting of iron (III) chloride, zinc chloride, zinc 2-ethylcaproate, tin(II) 2-ethylcaproate, dibutyltin(IV) dilaurate, molybdenum glycolate, and combinations thereof.

7. A process for making a low VOC coating composition which comprises contacting a bis(imine) reaction product of a diaminoalkane containing between two and five carbon atoms with an alkyl aldehyde containing between four and seven carbon atoms, with a polyisocyanate composition containing HDI trimer or HDI biuret to provide said low VOC coating composition, said low VOC coating composition being suitable for spray application onto a substrate at a solvent loading level of less than 2.0 pounds per gallon of said low VOC coating composition.

8. The process of claim 7 wherein said bis(imine) is a reaction product of 1,4-diaminobutane with isobutyraldehyde.

* * * * *